Aug. 5, 1969

W. S. ROUVEROL 3,460,016

SHIFTABLE ROTOR VARIABLE SPEED INDUCTION MOTOR

Filed Aug. 30, 1967

INVENTOR.
WILLIAM S. ROUVEROL
BY Gordon Wood.
ATTORNEY

United States Patent Office 3,460,016
Patented Aug. 5, 1969

3,460,016
SHIFTABLE ROTOR VARIABLE SPEED
INDUCTION MOTOR
William S. Rouverol, 2120 Haste St.,
Berkeley, Calif. 94704
Filed Aug. 30, 1967, Ser. No. 664,371
Int. Cl. H02k 17/02
U.S. Cl. 318—243                                    3 Claims

ABSTRACT OF THE DISCLOSURE

An induction motor having windings distributed non-uniformly over its field so as to produce different numbers of poles in different planes whereby continuous variation in speed is achieved by shifting the rotor to various positions within the field.

---

This invention relates to induction motors having means to vary the speed of the traveling magnetic field wave by altering the effective number of field poles. Specifically it discloses a construction wherein a single polyphase winding on an extended field can produce a traveling field wave that creates a series of tandem fields having different numbers of poles, so that shifting of the rotor to positions opposite different portions of the field causes the rotor to turn at different speeds.

Conventional induction motors have synchronous speeds of 120 $f/p$, where $f$ is the line frequency and $p$ is the number of poles. Since the line frequency is ordinarily fixed, the usual method of achieving appreciable speed variations is by means of utilizing a plurality of windings, or a single winding with a plurality of taps that can be interconnected, in order to alter the number of field poles. These expedients allow only stepwise variations of speed, however, and many industrial applications call for continuous variability.

The objective of the present invention is therefore to provide an induction motor that will have continuously variability over a wide range of operating speeds. A further object is to attain this characteristic in a device that will be efficient, compact, durable and economical.

The means to achieve these and other objects and advantages of the invention will be evident from the drawings as explained in the specification that follows.

Figure 1:
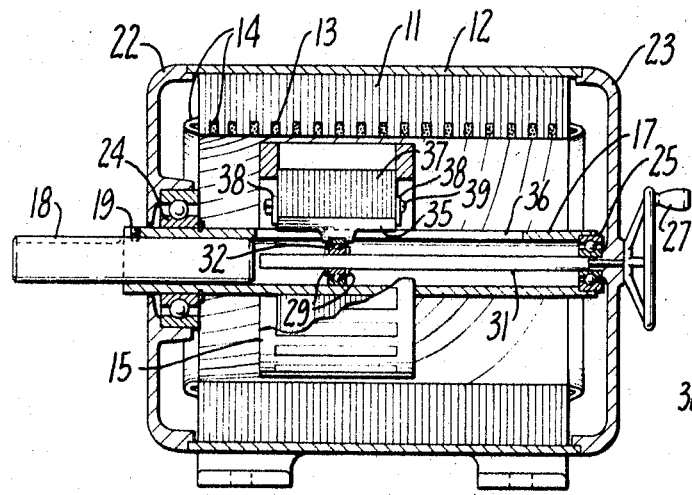
FIG. 1 is a longitudinal cross section of an induction motor embodying the invention.
Figure 3:
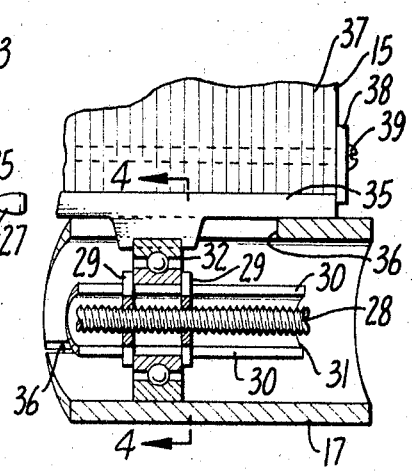
FIG. 3 is an enlarged sectional view of part of the control mechanism for the device of FIG. 1.
Figure 4:
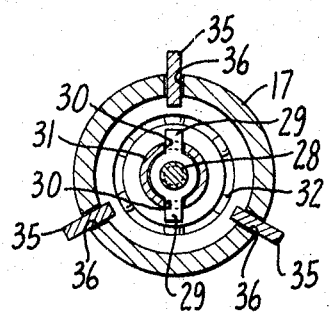
FIG. 4 is a cross section of the mechanism taken in a plane indicated by lines 4—4 of FIG. 3.
Figure 5:
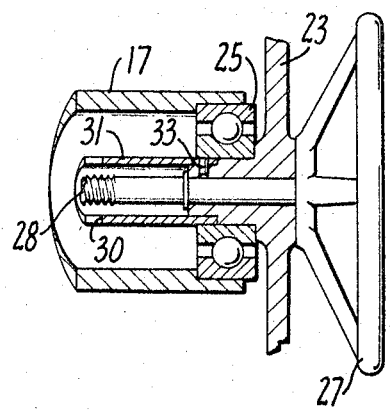
FIG. 5 is an enlarged sectional view of another part of the control mechanism.

In detail, and first with reference to FIG. 1, a hollow cylindrical core 11 of laminated ferromagnetic material is mounted within a cylindrical housing 12 and formed with slots 13 in its inner periphery. Laid within slots 13 are field windings 14. Coaxial with the core 11 is a narrow but otherwise standard squirrel-cage rotor 15 slidably mounted on a sleeve 17 within which is fitted the output shaft 18. Shaft 18 is keyed to sleeve 17 by means of a socket head set screw 19. End bells 22, 23, carry bearings 24, 25 rotatably supporting sleeve 17. Rotor 15 is adapted to be shifted axially by means of a crank 27 and a leadscrew 28, which control the position of two internally threaded dogs 29 (see FIGS. 3 and 4). Two lobes on opposite sides of dogs 29 extend through slots 30 in a fixed tube 31 to engage both sides of the inner race of a deep-groove ball bearing 32. Tube 31 is prevented from rotating by a pin 33 (FIG. 5) connecting it to end bell 23. The function of tube 31 is solely to prevent dogs 29 from turning with leadscrew 28. Assembly of the dogs 29 onto the leadscrew 28 is accomplished prior to insertion of the control mechanism into sleeve 17 by sliding bearing 32 onto tube 31, inserting one dog 29 on each side of bearing 32 edgewise through slot 30, then turning them 90°, pinching them against bearing 32 while leadscrew 28 is screwed through them until both dogs 29 are engaged.

Pressure to shift rotor 15 axially is transmitted from leadscrew 28 through compression on one of the dogs 29, to the inner race of bearing 32 and thence to the outer race of bearing 32 which rotates with the rotor 15, and is connected to it by keys 35. There are preferably three keys 35 which are notched to engage the outer race of bearing 32 and extend through slots 36 in sleeve 17. These keys are set in slots punched into the lamina 37 of rotor 15 and are prevented from axial movement with respect to the rotor 15 by disks 38 clamped to the rotor 15 by the rotor lamina tie rods 39.

Figure 2:
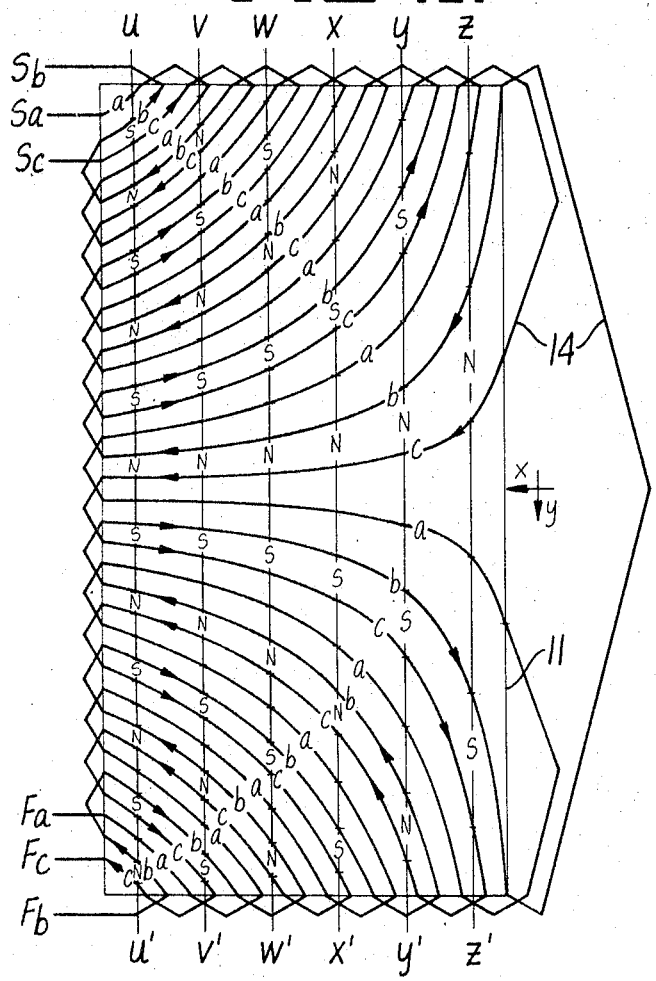
FIG. 2 is a 360° developed view of the stator of the motor of FIG. 1, showing the arrangement of the polyphase windings with the slots in which they are laid omitted for clarity.

FIG. 2 shows a full developed view of the inner periphery of the stator, comprising core 11 and windings 14. The windings are for three phase alternating current, to produce a traveling wave of magnetic flux which originates at the upper left-hand corner of the developed view, sweeps down to the right to the center of the right-hand side, then down and left again to the lower left-hand corner. $S_a$, $S_b$ and $S_c$ indicate the starting points of the windings for phases $a$, $b$ and $c$ respectively, and $F_a$, $F_b$ and $F_c$ are the corresponding finishing points.

It may be noted that the winding slots are laid out as hyperbolas, so that six slots intersect line $z$–$z'$ at points which are equally spaced. The line $z$–$z'$ represents the line of intersection of a diametral plane perpendicular to the rotor shaft 18 with the stator core 11, so that the six-slot equally spaced windings produce what amounts to a two-pole field at this plane. At line $y$–$y'$, twelve slots intersect the diametral plane, to produce a four-pole field. Similarly the windings at lines $x$–$x'$, $w$–$w'$, $v$–$v'$ and $u$–$u'$ produce 6-, 8-, 10- and 12-pole fields, respectively. These planes are henceforth referred to as "even-integer pole planes."

If phases $a$, $b$ and $c$ are considered at a particular moment when the current vector for phase $a$ is at 12 o'clock, that for phase $b$ is at 8 o'clock, and that for phase $c$ is at 4 o'clock, the current in phase $a$ will be zero, that in phase $b$ minus 0.866 times the peak current, and that in phase $c$ plus 0.866. Arrows indicating these currents are shown in FIG. 2, leftward and rightward pairs of arrows producing north and south flux maxima respectively. The sweep of these maxima down the developed plan is as indicated above. It will be evident that while the coils of a conventional induction motor can be wound on a mandrel of uniform diameter, the coils for a field such as shown in FIG. 2 must be wound on a stepped mandrel.

The extent to which the performance of a motor such as disclosed herein can be made to approach the performance of a conventional single speed induction motor depends on the extent to which various design features are incorporated. The features recommended below are intended to optimize efficiency by keeping iron and copper losses low, and to optimize power capacity by avoiding poor utilization such as results if too much of the rotor is involved in generator action and too little in motor action.

The most serious efficiency loss to which a variable speed induction motor is subjected is what might be called the "short stator" effect. This is an iron and copper loss that occurs in constructions wherein the rotor has a greater surface area than the stator (See U.S. patents to Steward, 1,559,920; Williams, 2,848,675; Rouverol, 3,265,949). This kind of construction imposes irreversibility losses due to the fact that magnetic energy stored in the rotor segments is dissipated in transient current and flux surges that occur after these segments have passed out from under the field and hence are not recoverable by generator effect. The subject invention is not susceptible to this kind of loss, since the extent of the field is greater than that of the rotor and there is no part of the rotor where current or flux is not able to exert a regenerative action on the stator.

The next most serious efficiency loss that can occur in variable speed induction motors is that attributable to core over-saturation from high transient currents induced by sudden changes in flux linkages. In a conventional induction motor, the number of ampere-turns in the stator windings is just sufficient to nearly saturate the field core under normal operating conditions. During starting, when the input current is several times greater than normal operating current, the design magnetomotive force (ampere-turns) of the stator is greatly exceeded, and there is a brief but serious loss in the stator and rotor copper as a result of core over-saturation. This is the same kind of loss which occurs continuously in a "short stator" motor each time a rotor element enters or leaves a magnetic field (except of course for those elements that happen to enter the field precisely at the moment when the field flux is passing through zero during its sinusoidal fluctuation). How much over-saturation does occur may be judged from the fact that the E.M.F.'s induced in the conductor bars of a conventional 3600 r.p.m. induction motor operating at 5% slip are proportional to a flux cutting rate that involves moving from a full north magnetic pole to a full south pole in ten revolutions or 3600°. A similar change at the discontinuity line of an induction motor with say five poles, or a change half as great in a "short stator" motor, would have to be made in 4 or 5°. It will therefore be evident that in either case these "impact" flux linkage changes are unrecoverable by regeneration: the currents they produce are simply too great to be transmitted into magnetic energy, because of the saturation limitations of the core material.

The way this problem is dealt within the subject invention is to eliminate any discontinuities in the flux that links the rotor elements, even through there is a complete discontinuity in the field flux at what will henceforth be referred to as the "discontinuity line," i.e., the line that appears in the developed view of FIG. 2 as the top and bottom boundaries of the figure. At this line it will be evident that twice each cycle a full north pole is immediately adjacent to a full south pole at planes midway between the "ideal" or "even-integer" planes. If a narrow rotor is used and it is aligned with one of these midway planes, the rotor slip will be very great and the efficiency quite low, for the reasons indicated above. However if the rotor is quite wide, on the other hand, this difficulty can be overcome.

It will be noted that the component of flux wave velocity in the axial direction produces rightwardly moving waves along the top edge of the layout of FIG. 2, and leftwardly moving along the lower edge. The velocity of these waves is constant because the slot spacing is constant in the axial direction, and the wave length must also be constant and equal to the axial distance between "ideal" planes whose pole numbers differ by four (i.e., the distance from say plane x–x' to plane z–z'. If a rotor is used which has a width substantially equal to one full axial flux wave length, its conductors will not be subjected to any sudden changes in flux linkage as they cross the field discontinuity line, because even though the axial components of the flux waves on either side of the discontinuity line may be out of phase, they will both have to sum to zero at all times by virtue of the fact that they are full waves and therefore encompass equal amounts of oppositely directed flux.

The flux linking the elements of a full wave length rotor thus cycles to zero once each rotation, as the element crosses the discontinuity line. The field region on either side of this line, for perhaps a sixth or a quarter of the field circumference, should therefore be considered a rotor conditioning region, where there is considerable motor-generator action but not much work done. Some work is done, of course, because of the general downward sweep of the flux waves at the normal circumferential velocity imposed by the hyperbolic field, as noted in the description of FIG. 2, but the rotor conditioning regions account for most of the losses in the subject type of motor, and probably not more than 15 to 20% of the rotor torque.

It would also appear that relatively long rotors would involve considerable motor-generator effect in all parts of the field. For example, a full axial wave length rotor centered in the 4-pole plane (y–y'), will have one end exactly aligned with the 6-pole plane (x–x') and the other end exactly aligned with the 2-pole plane (z–z'). The effective slip at the extreme ends of the rotor element will be very great. The synchronous speed of the rotor in this position is 1800 r.p.m., so the slip is minus 600 r.p.m. at the 6-pole end and plus 1800 r.p.m. at the 2-pole end. However the electromotive forces produced in the rotor conductors at synchronous speed by slip of such magnitude are not great, since the flux cutting is in opposite directions at the two ends of the rotor conductors. Further, there is no motor-generator action within the rotor circuits because the induced E.M.F.'s are in series. The only motor generator action that does occur is between rotor circuits in different parts of the field, by virtue of the parallel circuits provided by the rotor collector rings.

Motor-generator action, of the type which is unavoidable in the rotor conditioning region, may be considered tolerable in all parts of the rotor in the case of motors of low horsepower. Because it is a regenerative process it has only a secondary effect on efficiency, as compared to the losses associated with major discontinuities in flux cutting rate. Nevertheless, in large motors the need for high efficiency may be more critical, in which case it is possible to eliminate motor-generator effects entirely in the portions of the rotor outside the rotor conditioning region. This is accomplished by making variations in the air-gap or field windings (and in some cases slot spacing) sufficient to make the flux cutting rate of the rotor elements zero at synchronous speed.

One way to achieve this objective is to utilize the above mentioned variations (especially in the air-gap length) to make the field flux wave amplitude proportional to the ratio $$y/\sin \frac{y}{R}$$

where $y$ is the circumferential distance from the centerline of symmetry (FIG. 2), and R is the inner radius of the field core piece. If this variation of flux density is introduced, the general equation for flux density in the field will have the form $$b = \frac{By \sin \left(\omega t - \frac{xy}{2R}\right)}{\sin y/R} \qquad (1)$$

where $b$ is flux density at any point in the field of coordinates $x$ and $y$ at time $t$, B is maximum flux density on the centerline of symmetry ($y=0$), and $\omega$ is the circular frequency. For convenience, $x$ is taken as numerically equal to the number of poles at distance $x$ from the origin as shown in FIG. 2.

It will be observed that if Equation 1 is integrated over the width of the rotor, the total flux $\phi$ linking a narrow rectangle of width $\Delta$ and extending from $x-2$ to $x+2$ will be:

$$\phi = 4BR\Delta \sin\left(\omega t - \frac{xy}{2R}\right) \quad (2)$$

The total E.M.F. induced in the circuit enclosing the area under consideration is $$e = \frac{1}{10^8} \frac{d\theta}{dt} \quad (3)$$

where $d\phi/dt$ is the total derivative of Equation 2. For a given rotor setting, $x$ is constant, so Equation 2 is an equation of the form $$\phi = f(t,y) \quad (4)$$

and the total derivative of $\phi$ is $$d\theta = \frac{\partial f}{\partial t} dt + \frac{\partial f}{\partial y} dy \quad (5)$$

Dividing both sides by $dt$ gives:

$$\frac{d\theta}{dt} = \frac{\partial f}{\partial t} + \frac{\partial f}{\partial y} \cdot \frac{dy}{dt} \quad (6)$$

If the element under consideration is moving at a constant speed in synchronism with the field at the midpoint of the conductor, the quantity $dy/dt$ in Equation 6 may be expressed in terms of $x$:

$$\frac{dy}{dt} = \frac{2Rw}{x} \quad (7)$$

Using this expression and performing the differentiations called for in Equation 6 we obtain the result that $$\frac{d\phi}{dt} = 0 \quad (8)$$

which shows that the subject device has a true field speed for all positions of the rotor, with a rotor surface velocity as given by Equation 7 and that for the regions outside the rotor conditioning region the flux linking each rotor element remains constant.

It may be noted that the flux amplitude variation ratio, $$\frac{y}{\sin \frac{y}{R}}$$

goes to infinity at the discontinuity line, where $y = \pm \pi R$. This has no significance since the variation ratio is used only in the region outside the rotor conditioning region. Inside the rotor conditioning region, a uniform flux amplitude may be employed, or any other smooth curve serving as a continuation of the $$\frac{y}{\sin \frac{y}{R}}$$

curve.

The very specific description given above of the preferred form of the invention should not be taken as restrictive as it will be apparent that various modifications in design may be resorted to by those skilled in the art without departing from the scope of the following claims. For example it would be possible to shift the field piece rather than the rotor, or to interpose a magnetic bridge between the field piece and an elongated rotor, and to shift this bridge rather than the rotor. It is also possible to wind the field in different ways to produce substantially the same effect as that described. Similarly it is obvious that slots and windings may be employed for two-phase or single phase power supply with a split or capacitor phase employed to produce a traveling field. In general, many features of induction motors will be adaptable to this type of motor, such as (but not restricted to) wound or repulsion type rotors, centrifugal switches, and cooling fans. Operation of the motor as a variable frequency generator is also a possibility.

Modifications in the preferred field plan of FIG. 2 may readily be envisaged. For example the equation of the hyperbolic slot curves shown is $$xy = (2n-1)\frac{\pi R}{3} \quad (9)$$

where $x$, $y$ and $R$ are as before, and $n$ is the $n$th slot from the centerline of symmetry ($y=0$). It is obviously possible to locate a slot on the centerline of symmetry, and lay out subsequent slots half way between the slots shown in FIG. 2. In this case the slot equation becomes:

$$xy = \frac{2n\pi R}{3} \quad (10)$$

As indicated previously, deviations from the hyperbolic field pattern are of course also possible, especially in combination with variations in flux density by the use of a non-uniform air gap or variations in the number of turns in the various field coils. Since the stator lamina are dissimilar stampings, variations in air gap, in the $x$ direction, the $y$ direction, or both, are easily incorporated.

It will also be evident that the capacity of a unit can be increased by employing a second field similar to the one shown in FIG. 2 or a mirror image of it, either in tandem or, if the circumerential length is appropriately reduced, coaxially with the first field. Small improvements in efficiency are attainable by the use of dual fields, but these are not great enough to justify the increased costs of construction, except possibly in the case of very large motors.

For the purposes of the following claims the term "magnetic material" shall mean a material having a magnetic permeability at least fifty times that of air; and "electrically conductive material" shall mean a material with a resistivity not in excess of one hundred microohm-centimeters.

I claim:

1. In an electromagnetic machine, a cylindrical field piece comprising a core of magnetic material and electrically conductive windings adapted to produce a traveling wave of magnetic flux upon the surface of said core, said windings being in the form of coils laid in a plurality of slots in said core, the circumferential distance between adjacent slots measured in a first plane perpendicular to the central axis of said cylindrical field piece being substantially the same for all pairs of adjacent slots, said distance being substantially different for planes parallel to but displaced from said first plane, said slots being laid out in the form of continuous curves upon the surface of said core.

2. An electromagnetic machine according to claim 1 wherein said slots are laid out on a developed plan of said field piece substantially in the form of hyperbolas.

3. An electromagnetic machine according to claim 2 wherein an inducton rotor is mounted coaxially with said field piece, said rotor having an effective length in the axial direction substantially equal to the axial distance between said first plane and a second plane having as many more said circumferential distances than said first plane as there are said circumferential distances in a third plane having windings sufficient to produce two north poles and two south poles of traveling magnetic flux waves.

References Cited

UNITED STATES PATENTS

| | | | |
|---|---|---|---|
| 1,522,742 | 1/1925 | Parvin | 310—112 |
| 3,017,528 | 1/1962 | Ellis | 310—166 X |
| 3,167,700 | 1/1965 | Neyhouse | 310—166 X |
| 3,254,288 | 5/1966 | Hutson | 318—243 |
| 3,265,949 | 8/1966 | Rouverol | 318—243 |
| 3,290,574 | 12/1966 | Roe | 318—214 |

WARREN E. RAY, Primary Examiner

U.S. Cl. X.R.

310—195, 258